United States Patent Office 3,087,204
Patented Apr. 30, 1963

3,087,204
CONTROL DEVICE FOR USE IN PROCESSES WHEREIN CONTINUOUS LENGTHS OF MATERIALS ARE TREATED
Harold Catling, Didsbury, Manchester, England, assignor to The Cotton Silk and Man-Made Fibres Research Association
Filed July 31, 1958, Ser. No. 752,327
Claims priority, application Great Britain Aug. 3, 1957
4 Claims. (Cl. 19—240)

This invention concerns control devices for use in continuous processes such as, for example, wire drawing, sheet rolling, and textile drafting processes, the material passing continuously through successive stages of treatment, and there being one machine or more than one machine arranged "in parallel," at each stage (hereinafter called "a process of the type described"). The invention is particularly, though not exclusively, concerned with a process of the type described in which at one stage a plurality of secondary machines process material, all of which, at some earlier stage has been processed by the same primary machine (hereinafter called "an expanding process of the type described").

As is well known, a property of the product of a machine which processes a continuous length of material can be automatically controlled either by an "open-loop" system or a "feed-back" system. With an open loop control system, a property of the product entering the machine is measured, and fluctuations of the measured property are used compensatively to control the operation of the machine, whereas with a feed-back system, the fluctuations of the measured property of the product issuing from the machine are used compensatively to control its operation.

In a practical operation of such control systems, there is an important factor to be taken into consideration, and this is that no measuring equipment is perfect and is subject to long-term loss of accuracy. This may be due, for example, to ageing of electrical components, wear of mechanical components, and changes in local conditions, such as humidity, for instance. Such loss of accuracy is manifested in the slow change in the mean value of the controlled property. For example, in a wire drawing process in which the reduction in diameter is controlled by varying the tension in the wire according to the diameter as measured continuously, it is relatively easy to avoid rapid fluctuations in the diameter of the wire, but very difficult to ensure that the mean diameter does not change slowly as a result of drift in the measuring apparatus.

Apart from their general undesirability, one very disadvantageous result of such slow changes in the measuring apparatus in an expanding system of the type described is that, in the measuring apparatus at each secondary machine, the changes will almost always be different in degree. Thus, the known control systems referred to, in such processes, can allow not only changes in the mean level of the property concerned, but differential changes as between secondary machines and the entire usefulness of a control system in such a process may be lost if there is differential drift between secondary machines.

In certain special cases, where the system is an expanding one, and in which continuous lengths of material are processed simultaneously by the primary machine and then fed to the respective secondary machines, changes in mean level can be tolerated provided there is no such differential change.

A still further factor to be taken into consideration is the possibility of change in the characteristics of the material fed to the secondary machine. For example, if the property to be controlled is weight per unit area and this is, for control purposes, measured by thickness, and the material becomes more compact, then for the same weight per unit area going in the control system will act on a different thickness measurement, and make an unnecessary correction.

The object of the present invention is, for processes of the type described, to provide a control device in which the effect of such drift, and such changes in characteristics, as hereinbefore described, are automatically compensated for.

According to the present invention there is provided, in, or for use in, a process of the type described in which a property of the material is to be modified by a machine at a given treatment stage, a control device comprising means for measuring said property directly or indirectly, so as to detect substantially short-term fluctuations in said property at said treatment stage, and adapted, on detecting such fluctuations, to control the action of the machine to compensate therefor, and means for detecting any substantially long-term change in the mean degree of modification effected by said machine, and adapted, on detecting any such change, to adjust the controlling effect of said first-mentioned means to compensate therefor.

The invention will now be described further, by way of example, with reference to the accompanying diagrams, in which, FIG. 1 illustrates diagrammatically an expanding system of the type described;

FIG. 3 is a plan view of the mechanical parts of FIG. 2;

FIG. 4 illustrates diagrammatically a non-expanding process of the type described.

FIGS. 2 and 3 show a drafting head incorporating a control device according to the invention. The drafting head is one of a number of such heads H (FIG. 1) which draft a corresponding number of laps from a single scutcher S or other lap-forming source.

Figure 1:
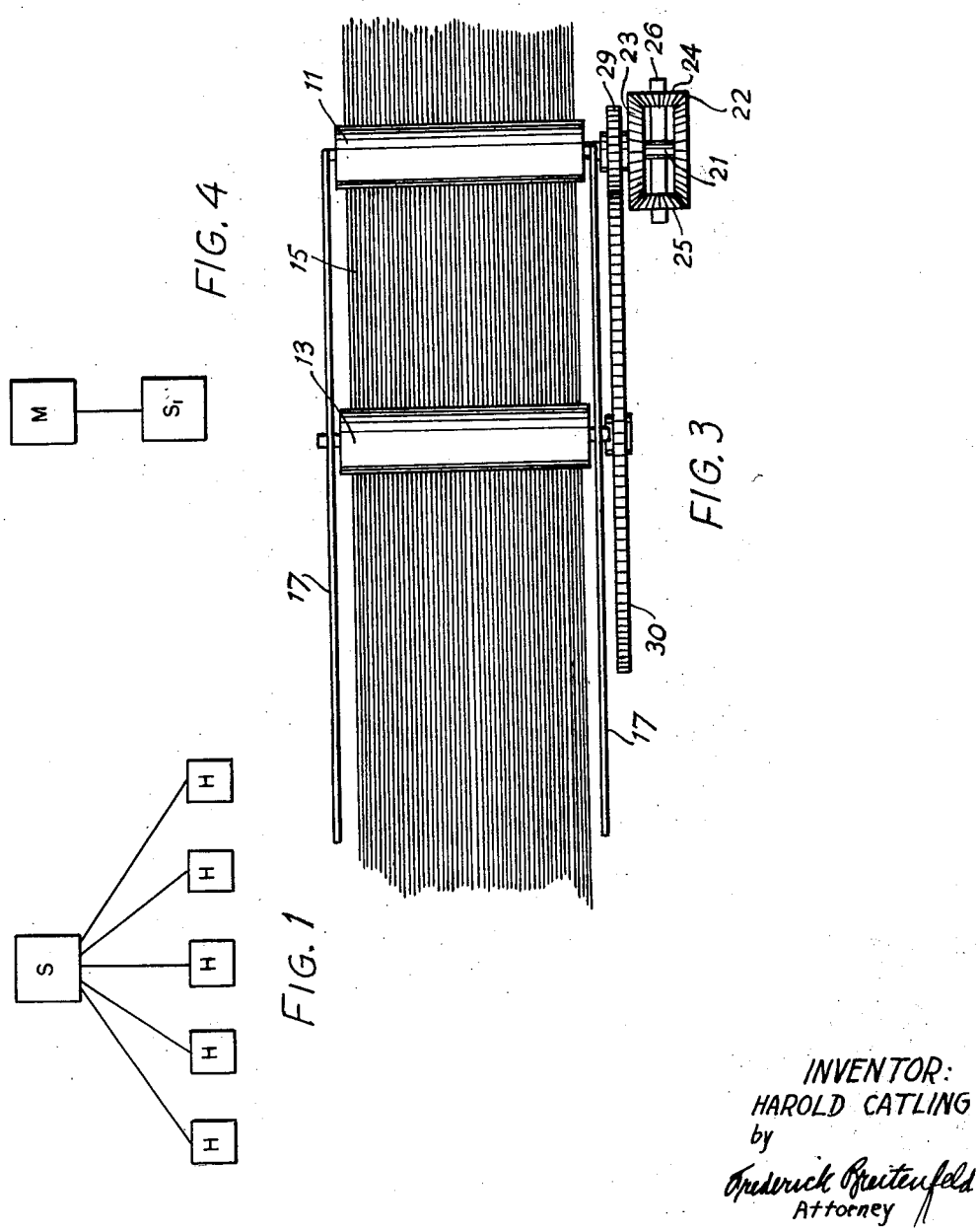
Figure 2:
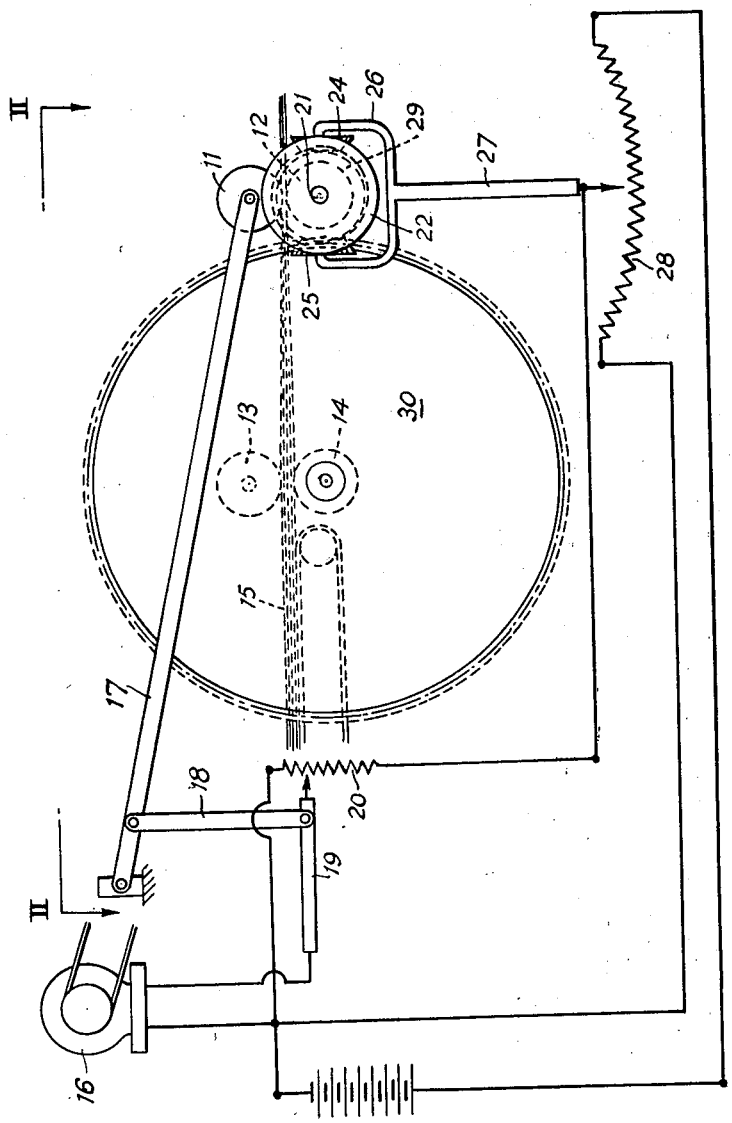
FIG. 2 illustrates the application of the invention to such an expanding process.

Each drafting head includes the usual pairs of front and back rollers 11, 12 and 13, 14, each pair providing a nip, the material 15 to be drafted entering between the back rollers 13, 14 and emerging, as a sliver, from the front rollers 11, 12.

The lower roller 14 of the back pair is driven at a fixed speed by a suitable motor drive (not shown). The lower roller 12 of the front pair is positively driven by a variable speed electric motor 16, and the upper roller 11 of this pair is carried upon arms which are pivoted at a point some distance away from the roller 11, so that the roller 11 can move up and down slightly in accordance with variations in thickness in the sliver passing between it and the lower front roller 12. One of the arms 17 is coupled, through a suitable link system 18 to the movable arm 19 of a variable resistance 20 in an electrical control circuit for the electric motor 16, the arrangement being such that when the sliver thickness increases, the motor 16 is speeded up to increase the draft, thus compensating for the increase in thickness.

The lower roller 12 of the front pair has an extended shaft 21 on the outer end of which is secured a first crown wheel 22 of a differential gear which comprises two parallel crown wheels 22, 23 meshing with intermediate pinions 24, 25 which are disposed therebetween. A cage 26 for the pinions 24, 25 carries a lever 27 in such manner that it will pivot about the axis of the crown wheels 22, 23 of the differential and of the lower roller 12 if the pinions 24, 25 tend to move around the crown wheels 22, 23.

The lever 27 constitutes the movable arm of a second variable resistance 28 in the electrical control circuit of the driving motor 16 for the lower front roller 12, so that when the lever 27 pivots as aforesaid it will vary the amount of the second resistance 28 in the circuit. Such second resistance 28 is incorporated in the circuit so that it is capable of modifying the effect of variations of the first variable resistance 20.

The crown wheel 23 of the differential is integral with a pinion 29 which meshes with a gear wheel 30, the reduction ratio being equal to the nominal draft of the drafting head, the gear wheel 30 being mounted for rotation with the lower roller 14 of the back pair on the shaft thereof.

In operation, the control above described serves, by movement of the upper roller 11 of the front pair to measure the thickness of the sliver (which can be used as a measure of its weight per unit length) and, by variation of the first variable resistance 20, to control the speed of the motor 16 driving the lower front roller 12 in relation thereto to compensate for differences in thickness or weight per unit length. Thus, if the measured thickness is too great, the front roller speed is increased to increase the draft to reduce the thickness.

The speed of the front rollers 11, 12, however, is determined not only by the measured thickness but also by the integrated deviation of the draft from its nominal value. If the actual mean draft and the nominal draft remain equal, the pinion carrier 26 of the differential gear remains stationary and the motor control is dependent upon the thickness of the sliver only. If necessary, the effect of the integrated deviation may be subject to be slow acting so that the compensating variation of the control circuit of the variable speed motor 16 lags behind the changes in the mean draft. When such changes occur, then the pinion carrier 26 of the differential is caused to move relative to the crown wheels 22, 23 to alter the signal to the variable speed motor 16 in such a way that the mean draft tends to return to its nominal value.

It will be observed that control of short-term fluctuations is by way of a feed back control system. In conjunction with the control arrangement just described, automatic or manual control over the mean weight of the laps fed to the individual drafting heads will be used, as is commonly done, and extremely consistent slivers will be produced. Not only will there be no variation between drafting heads, but the mean weight will not vary.

Figure 5:
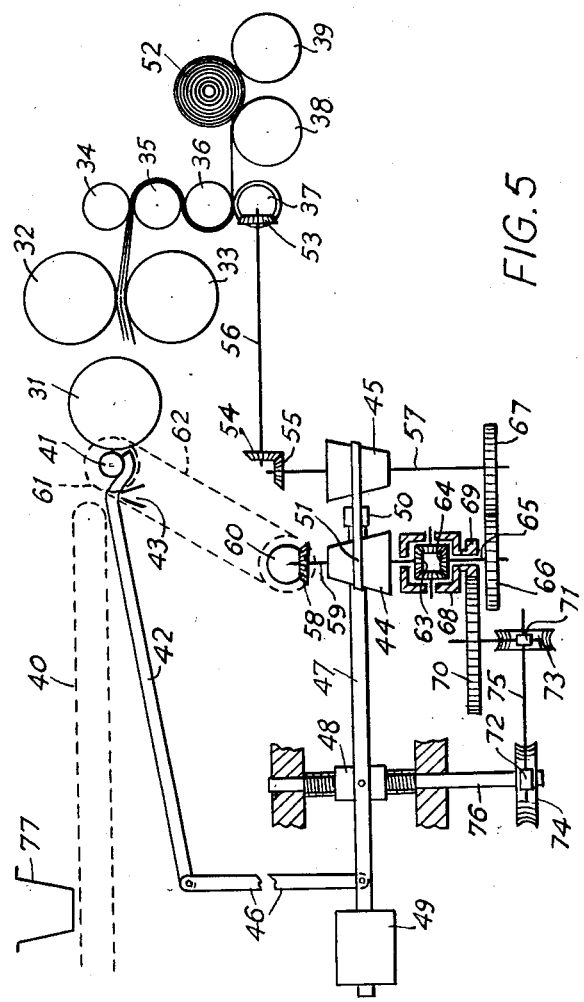
FIG. 5 illustrates the application of the invention to such a non-expanding process.

Referring now to FIGURES 4 and 5 of the drawings, another embodiment of the invention is illustrated. In this case, control of long and short-term variations in weight per unit length of the fibrous web or lap produced by a scutcher $S_1$ is effected. A scutcher, unlike a draw frame, does not receive only part of the product issuing from a preceding machine M, but the whole of the product.

Scutchers are commonly provided with tripod feed regulators. In such a regulator, pedals work on a knife-edged fulcrum and operate through a balanced system of levers, which are connected to a belt that runs on opposed cone drums. When the pedals move, due to uneven thickness of the layer of cotton or the like, passing between the pedal roller and the pedals, the belt is adjusted on the cone drums to alter the speed of the pedal roller in compensating fashion. FIG. 5 shows diagrammatically such a scutcher modified to operate according to the present invention.

The main elements of the scutcher are the beater 31, the top cage 32, the bottom cage 33, the calender rollers 34, 35, 36, 37 and the lap rollers 38, 39, this part of the machine being fed with cotton by a feed lattice 40 and via a pedal roller 41 operatively associated with a pedal assembly 42 supported by a knife rail 43. The usual opposed cone drums 44, 45 are provided.

The pedal assembly 42 is connected by a link motion 46 to a lever 47 which is itself pivoted to a nut 48. One end of the lever 47 carries a counterweight 49 while the other end carries means 50 for shifting a belt 51 running on the cone drums 44, 45. This part of the arrangement constitutes an open loop control system for short-term variations in the thickness of the lap 52 since, as has been explained, variation in the thickness of the web fed to the scutcher by the lattice 40, if the operation of the machine remained constant, would cause variation in the thickness of the finished lap 52.

The means for control is now described in detail. First it is arranged that the cone drum 45 is driven at a fixed speed. In the embodiment being described, the main drive is to the beater 31 and then by means of a chain and chain wheel system, in the usual way, to the cages 32, 33, calender rollers 34, 35, 36, 37 and lap rollers 38, 39. The drive is a constant speed drive and it is transmitted to the cone drum 45 by bevel gears 53, 54, 55 and shafts 56, 57 from the calender roller 37. Second, the cone drum 44 is arranged to drive the pedal roller 41 by means of a bevel gear 58 mounted on its shaft 59, chain wheels 60, 61 and chain 62. Thus, as can be ascertained from FIG. 5, if a thick part in the web from the feed lattice begins to pass beneath the pedal roller 41, the pedal assembly 42 will be depressed, and, acting through the link motion 46, will cause the lever 47 to move in clockwise direction so as to shift the belt 51 downwards. This shift of the belt will result in a slowing down of the pedal roller 41 and the reduced rate of feed to the beater 31 will compensate for the increased thickness of the web. The control mechanism operates similarly in the opposite sense if a thin part in the web passes under the pedal roller.

A differential gear is provided, one crown wheel 63 being mounted on the shaft 59 of the cone drum 44, and the other crown wheel 64 being mounted on a shaft 65 driven through gears 66, 67 from the fixed speed shaft 57 of the other cone drum 45. The pinion carrier 68 of the differential gear has a gear wheel portion 69 which meshes with a gear wheel 70, which in turn drives, through worms 71, 72, worm wheels 73, 74 and shaft 75, a lead screw 76. The lead screw is threadedly engaged with the nut 48, and is axially fixed so that rotation thereof will cause adjustment of the position of nut 48, thus shifting the fulcrum of the lever 47.

It will be appreciated that the part of the arrangement just described is capable of altering the means operating characteristics of the short-term control system. Thus, it is designed so that the speds of the control drums 44, 45 are the same when laps of nominal thickness enter the machine and the pinion carrier is then stationary. A weighing hopper 77 or the like will normally be provided to ensure that the mean weight per unit area of the laps entering the machine is constant. However, should the thickness of the laps alter because of drift in the accuracy of the feed regulator, or because of change in the regularity of the material, movement of the pinion carrier 68 of the differential gear will occur, and this movement will be transmitted to the lead screw 76 and thus to the nut 48. The movement of the nut is arranged to be corrective, the "zero position" of the feed regulator being adjusted so that the short-term control will still operate about a zero-position at which the cone drums 44, 45 rotate at the same speed.

In the embodiment just described it will, as before, be desirable that the long-term control should act in a somewhat delayed manner and the gearing is of large reduction for this purpose. A feed-back instead of open-loop system for control of short-term variations could be used if desired.

I claim:

1. A control device, in, or for use in, a process of the type decribed in which a property of the material is to be modified upon passage through a machine, comprising first means for measuring said property so as to detect substantially short-term fluctuations in said property, and adapted, on detecting such fluctuations, to control the action of the machine to compensate therefor, and second means for detecting any substantially long-term change in the mean degree of modification effected upon passage through said machine, and adapted, on detecting any such change, to adjust the controlling effect of said first means to compensate therefor, said second means being responsive only to the controlling action of said first means.

2. A control device as set forth in claim 1, said second detecting means comprising a differential mechanism including a pair of opposed crown wheels, pinions interposed between them, and a pinion carrier, one of said crown wheels being driven in timed relation to the controlling action of said first means, the other crown wheel being independently driven at a constant speed, the pinion carrier forming part of the second means which correctively adjusts for said long-term changes.

3. A control device as set forth in claim 1, in which said machine is a textile fibre drafting machine.

4. A control device as set forth in claim 1, in which said machine is a scutcher.

References Cited in the file of this patent

UNITED STATES PATENTS

| | | |
|---|---|---|
| 2,356,660 | Deuel | Aug. 22, 1944 |
| 2,670,650 | Wilmotte | Mar. 2, 1954 |
| 2,682,144 | Hare | June 29, 1954 |
| 2,746,093 | Raper | May 22, 1956 |
| 2,778,186 | Luttgen et al. | Jan. 22, 1957 |
| 2,805,449 | Martin | Sept. 10, 1957 |
| 2,930,084 | Sanborn | Mar. 29, 1960 |
| 2,950,508 | Locher | Aug. 30, 1960 |
| 2,964,803 | Robinson | Dec. 20, 1960 |
| 2,981,986 | Neil | May 2, 1961 |